United States Patent [19]

Crase

[11] 4,067,404
[45] Jan. 10, 1978

[54] ANGLE ADJUSTMENT SUB

[75] Inventor: Gary M. Crase, Cypress, Calif.

[73] Assignee: Smith International, Inc., Newport Beach, Calif.

[21] Appl. No.: 683,193

[22] Filed: May 4, 1976

[51] Int. Cl.² ............................................. E21B 7/08
[52] U.S. Cl. ....................................... 175/75; 285/89; 285/91; 285/93; 285/184; 285/333
[58] Field of Search ............... 285/118, 184, 333, 334, 285/90, 91, 305, 223, 89, 32, 404; 175/107, 61, 73, 74, 75, 76

[56] References Cited

U.S. PATENT DOCUMENTS

| 1,349,518 | 8/1920 | Lyle | 285/333 X |
|---|---|---|---|
| 2,090,008 | 8/1937 | Newmark et al. | 285/404 X |
| 2,320,107 | 5/1943 | Speckert | 285/333 X |
| 2,501,217 | 3/1950 | Hawn | 285/184 X |
| 2,646,253 | 7/1953 | Johnston | 175/61 |
| 2,680,358 | 6/1954 | Zublin | 285/91 X |
| 2,746,773 | 5/1956 | Bily | 285/90 X |
| 3,128,825 | 4/1964 | Blagg | 285/223 X |
| 3,189,372 | 6/1965 | Johnson | 285/91 |
| 3,260,318 | 7/1966 | Neilson et al. | 175/107 X |
| 3,398,804 | 8/1968 | Holbert | 175/61 |
| 3,563,323 | 2/1971 | Edgecombe | 175/107 X |

FOREIGN PATENT DOCUMENTS

| 657,749 | 1/1929 | France | 175/75 |

Primary Examiner—Thomas F. Callaghan
Attorney, Agent, or Firm—Subkow and Kriegel

[57] ABSTRACT

An angle adjustment sub which permits the rotational adjustment of adjacent portions of a running string to bring the axis of adjacent portions of a running string, which are deviated at different vertical angles, into a common planar axis.

22 Claims, 9 Drawing Figures

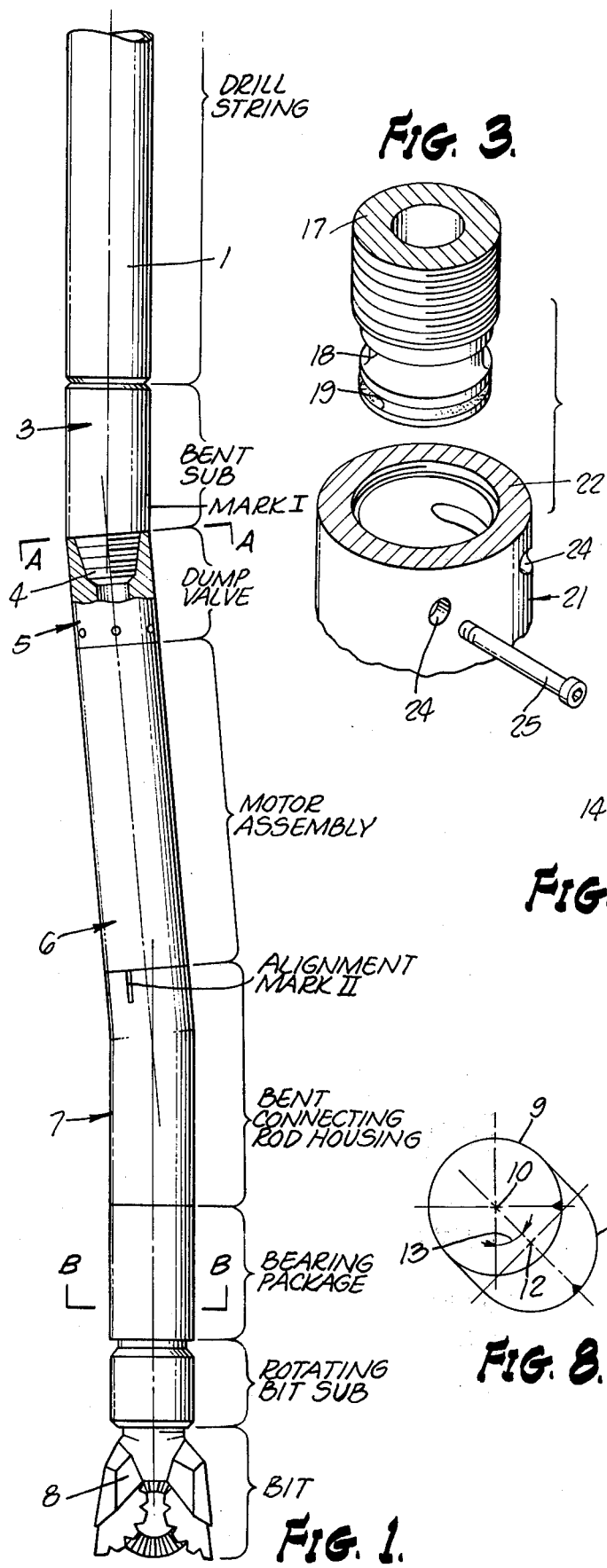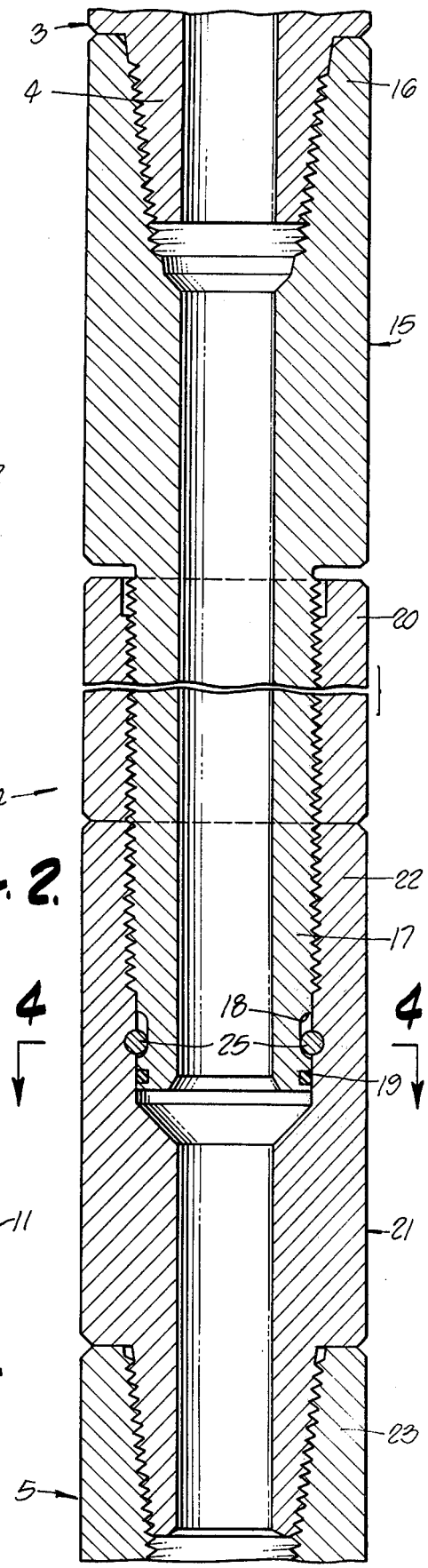

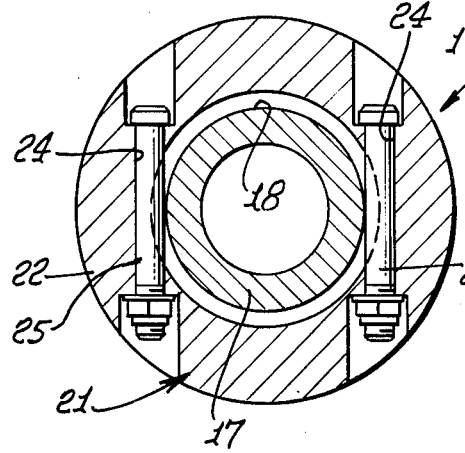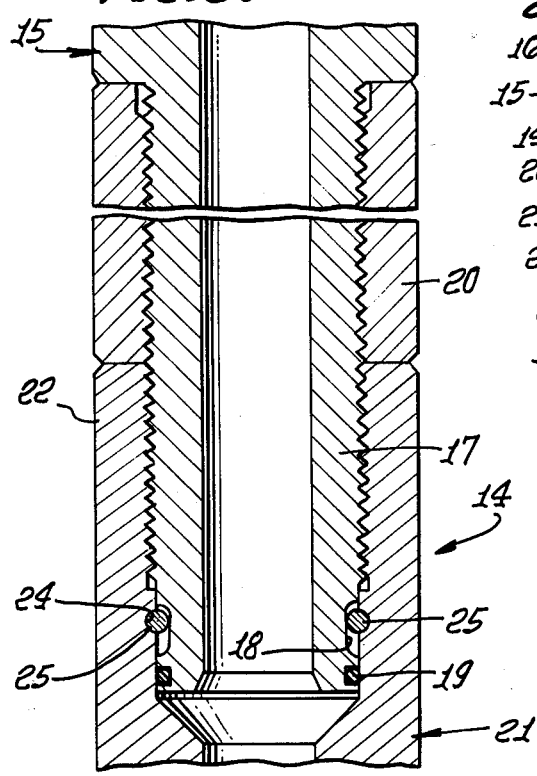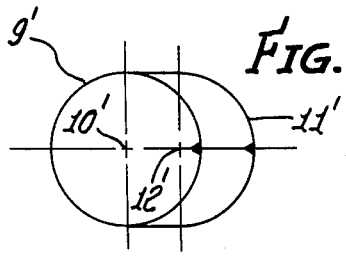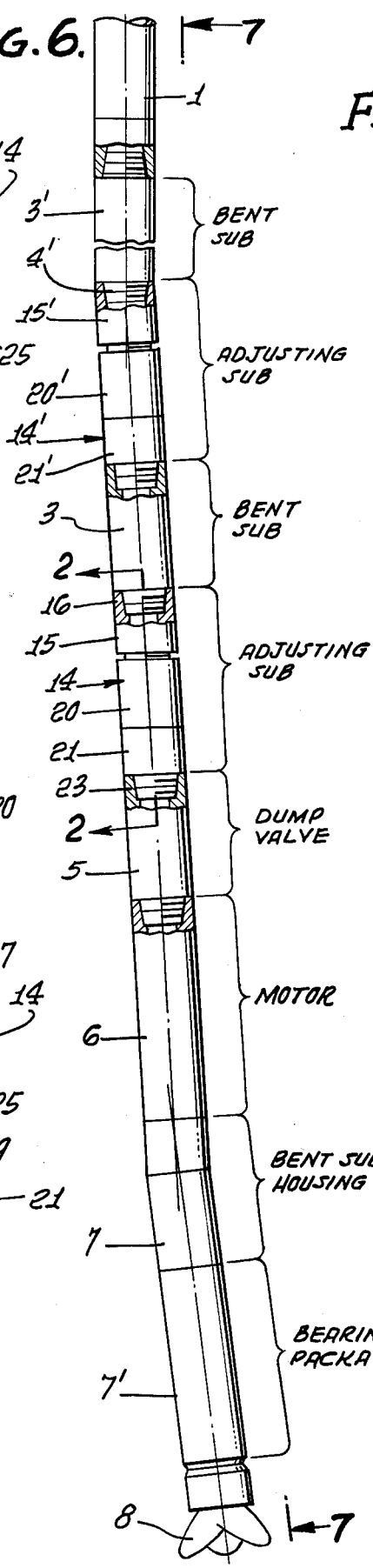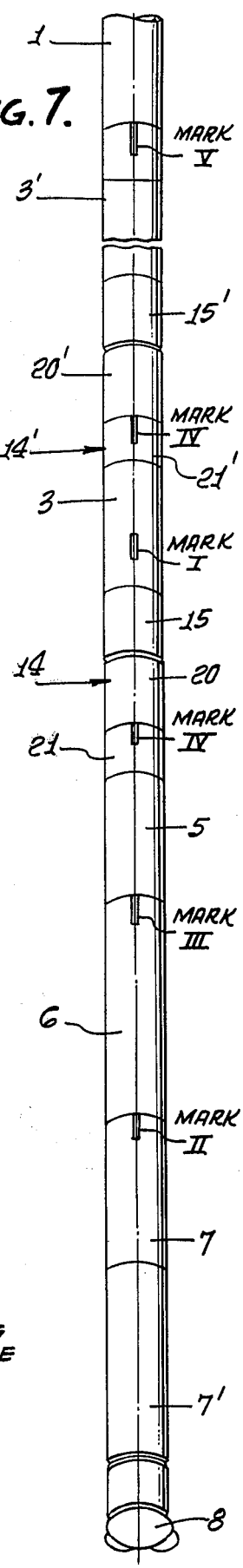

ANGLE ADJUSTMENT SUB

This invention relates to an angle adjustment sub to be employed in deviated drill strings and to drill strings employing the same.

BACKGROUND OF THE INVENTION

It has been the practice in drilling deviated bore holes to employ bent subs and bent housings in connection with running strings, for example, drill strings employed in drilling oil wells.

The bent subs or the bent housings (see, for example, U.S. Pat. No. 3,260,318) introduce an angle into the drill assembly. The angle is related to the vertical angle of the desired deviation.

However, the bend angle practically permissible in the prior art for a single deviating unit is very limited, in the range of 1 to 3°, in order to that the drill string, in deep holes, may pass freely into the bore hole. In order to obtain a drilling assembly with a greater degree of bend, a combination of bent sub and bent housing may be used. If a greater bend than the one obtained by using a bent sub/bent housing combination is desirable, deviating units which may be bent after they are inserted in the hole, such as described in U.S. Pat. No. 3,627,356, may be employed.

Except accidentally, the plane of maximum bend angle direction of the axes of the angle deviating units with any arbitrarily selected plane through the axis of the drill string will vary in a random fashion as the string is made up.

STATEMENT OF THE INVENTION

The purpose of this invention is to align the longitudinal angle between bent subs, bent housings, or a combination of bent subs and bent housings, each of limited angle. Thus the total vertical angle of the drill string is the sum of the angles of the angle deviating units employed in the string.

It is the object of this invention to assure that several angular elements are aligned so that the longitudinal axis of each of the angular units and of the drill string and the bit are all substantially coplanar. This permits conventional orientation methods to be applied.

Each angle deviating unit is inscribed with a line indicating the plane of maximum bend angle. My invention, when placed between any such two angle deviating units, provides a means whereby the scribe lines may be easily aligned and the assembly locked in place, thus assuring that the angles of the deviating units are coplanar. Once the units are locked in place and run into the bore hole at the end of the drill string, normal orienting methods may be employed to align the bent units with the desired hole direction.

These and other objects of my invention will appear from the following description taken together with the drawings in which:

FIG. 1 is a partial assembly drawing, with parts in section, of a fragment of the drill string employing a conventional bent sub and a bent housing in random assembly;

FIG. 2 is a vertical section on line 2—2 of FIG. 6;

FIG. 3 is a fragmentary exploded view of a detail of FIG. 2;

FIG. 4 is a section taken on line 4—4 of FIG. 2;

FIG. 5 is a fragmentary view of FIG. 2;

FIG. 6 shows an application of the alignment connector of my invention;

FIG. 7 is a front view of FIG. 6 along line 7—7;

FIGS. 8 and 9 are schematic drawings, not to scale, of projections on a plane perpendicular to the axis shown on FIGS. 1 and 7 respectively.

FIG. 1 illustrates the random assembly employing multiple angle changes in a conventional running string such as a drill string. In FIG. 1, 1 is a portion of the conventional drill string made up of stands of drill pipe connected by box and pin connections and extending to the surface and at its upper end connected to a kelly which can be rotated by the conventional rotary table. To introduce an angular deviation, so as to direct the bit 8 at a vertical angle in a vertical plane, devices such as a bent sub or bent housing are employed. FIG. 1 shows such a bent sub at 3 carrying an alignment Mark I, and a bent housing at 7 with its alignment Mark II connected to the bearing package 7 (See U.S. Pat. No. 3,260,318) and bit 8. The bent sub 3 is composed of a body tubular portion of bore similar to the drill pipe and a pin end 4 whose axis is cut at an angle to the axis of the main bore of the sub 3 which is coincident with the axis of the adjacent portion of the drill string 1. The lower pin 4 is cut with its axis at a desired angle to the main axis of the sub, usually 2 to 3° where only one angle deviation unit is used with the downhole motor 6, such as a hydraulic motor, the drill bit 8 will have the desired direction when oriented by the usual methods.

Where a downhole motor, such as the progressive cavity hydraulic motor 6 is used (see U.S. Pat. No. 3,894,818), a bent housing 7 may be employed (see U.S. Pat. No. 3,260,318) to supply an additional angle change. The motor is connected, as shown in FIG. 1, to the bent sub 3 through a conventional dump valve 5.

Such angle changes occur in drilling deviated bore holes. The vertical angle of the bore hole is progressively increased at the rate determined by the angles of bend of the deviating units so as to direct the bit in a curved path into the earth. The conventional bent subs and bent housings introduce each a limited angle change, for example, each one or two degrees. The local angle change is limited by the diameter of the bore so as to permit the drill string to pass freely through the bore hole. In order to increase the total angle, devices are used which are mounted axially of the drill string when the string passes into the hole and may be bent to a selected angle after the device reaches the desired location in the hole. Such a device is illustrated in U.S. Pat. No. 3,627,356, referred to above.

When more than one change in vertical angle is introduced by the multiple angle changing units, the plane of maximum bend angle of the axis of the various parts of the drill string will be different except in the rare cases where they accidentally coincide. The vertical angle at the bit with respect to a plane will not be the desired angle in the vertical plane in the azimuthal direction of the desired bit advance. By the angle adjustment sub of my invention, the plane of the maximum bend angle which includes the axis of the various angle deviating units may be brought into planar coincidence and the desired vertical angle and direction of the bit axis established by conventional orienting procedure.

This is illustrated on FIGS. 6 to 9 to be described below. The examples are for purposes of explanation and are not as a limitation of my invention.

With the arrangement, such as is shown in FIG. 1, the axis of the bit with respect to the axis of the bent sub 3 and the drill pipe 1, depends on random makeup of the threads and the axis of the pin 4; the axis of the bit 8 will, except accidentally, not be coplanar. In making the assembly, the bent housing 7, to the upper end of which the motor 6 is connected, is, in turn, connected to the drill bit 8; the motor is connected to the drill bit 8, all connections being made by threaded joints.

Unless by accident, the direction of the axis of the drill bit 8 may be quite different from that of the axis of the pin 4 (see FIG. 1) by reason of the accidental orientations introduced when the box and pins are made up.

This is illustrated by FIG. 8, where the assumptions are arbitrary and exaggerated for illustrative purpose.

The circle 9, centered at 10, is a projection of the plane A—A, perpendicular to the axis of the bent sub, which is assumed vertical. The axis of the motor assembly 6 is at the angle imposed by the pin 4 of the bent sub 3, for example 2°. The projection of the end of the bent housing, bearing package and bit, for example, at the section B—B is at 11 centered at 12. As will be seen, in the assumed case, the azimuthal angle of the bit has deviated through an angle 13 from that of the bent sub.

In my invention, by using a direction adjusting sub as described herein, the axis of the pin 4 and of the bent housing 7 and bit 8 may all be brought into the same azimuthal direction, i.e., be coplanar. This may be accomplished irrespective of the number of angle deviating units employed. In order to accomplish this adjustment, I introduce an adjusting sub between two angle deviating devices. A preferred embodiment of the adjusting sub is shown in FIGS. 2 through 7.

The direction adjusting sub 14 (see FIGS. 2 and 5) is composed of a sub 14, having a box end 16 and elongated pin end 17. The pin carries an elongated circular groove 18 adjacent its end and "O" ring in groove 19. Threaded on the pin 17 is a nut 20 at the end of the box 22. The pin 17 is threaded into the box 22 of the sub 21 to be connected to a box 23 of a drill string unit. The sub 21 is bored adjacent its end at 24. The centers of the bores 24 are spaced so as to intercept the interior surface of box 22 (see FIG. 3). They carry two studs 25 which occupy both the bores 24 and axially elongated groove 18.

The sub 21 may be connected to a deviation unit, for example, a bent sub such as 3, or bent housing such as 7 and the sub 15 to another such unit (see FIG. 6). Having retracted the nut 20 on the threads, the section 15 is rotated on the screw threads, the studs 25 riding in groove 18. The rotation is permitted by the position of the studs 25 described above. The degree of rotation is such as to bring the axes of the bent sub and housing into a common plane as is illustrated in FIGS. 7-9. The nut 20 is returned to the position shown in FIG. 2 against the end of the box 22 to lock the system in position and secure against accidental displacement. The studs 25, cooperating with the slot 18, form a motion limiting stop which limits the longitudinal, i.e., axial displacement of the pin 17 in the box 22. If, for some reason, the nut 20 becomes retracted from the box 22, the pin 17 could not be retracted from the box 22, beyond a distance limited by the slot 18, when studs 25 shoulder against the lower end of the slot. The elongated slot permits the rotation of the pin 17 in the box 22 for any angular displacement, for example, up to 360°. The slot is of sufficient length depending on the pitch of the thread of the box and pin.

The above procedure is illustrated in FIGS. 6 and 7. The desired vertical angle deviation is imparted to the string at the bit to respond to that of the sum of the angle at the bent housing plug the angle of bend at the bent subs. However, the azimuthal direction of the vertical angle is the same, i.e., is substantially coplanar.

After the bit 8, the bearing package, and the bent housing 7 are connected in the normal manner, the Mark II scribe line positioned in the plane of the maximum bent angle of the bent housing is transferred to the dump valve, i.e., top end of the motor, at Mark III, coplanar with Mark II which plane contains the axis of the motor 6 and dump valve 5. The motor is lowered through the rotary table and clamped. The pin 26 of the adjusting sub is connected to the dump valve, i.e., top of the motor.

The pin 4 of the bent sub is entered and secured in the box 16 of the angle adjustment sub 14.

The assembly is then raised until Mark III on the upper end of the motor 6 is visible and a scribe line, Mark IV, is placed on the lower segment 21 in alignment with Mark III. The lowermost segment 21 is positioned on the clamps in the rotary table. The nut 20 is loosened and by rotation of the section 15 of the angle adjustment sub 14 will bring scribe line, Mark I, positioned in the plane of the maximum bend angle, of the bent sub 3 into alignment with the Mark II, Mark III, and Mark IV. The jam nut 20 of the adjusting sub 14 is then tightened to prevent relative rotation of the section 15 and 21 of the sub 14.

If the total angle obtained by using the above assembly has reached a maximum safe angle at the bit, for example 4° from vertical, and it is desired to add an additional vertical angular deviation at the bit, this may be accomplished by employing an angle deviation unit 27 which has no angle of bend as it enters the hole but may be deviated after it is in the hole at the desired depth. Such a device is illustrated in U.S. Pat. No. 3,627,356 referred to above.

To assure the proper orientation when using the third angle deviation unit and to assure that the angle of bend in the third unit is coplanar with the plane established by Marks I, II, III, and IV, a second angle adjustment sub 14', of the same construction, as 14, is employed (see FIGS. 6 and 7). The direction adjusting sub 14' is mounted and the pin sub 15' manipulated with respect to sub 21' using nut 20' as described above to bring scribe line, Mark V, in alignment with the Marks I, II, III, and IV.

The vertical angle adjusting subs have brought all of the axes of the various units into one plane as is illustrated by FIG. 7, as is evidenced that the projections of their axes are all in the plane of the sheet in a straight line. This is illustrated in FIG. 9 in which the portions marked 9' through 12' have a meaning similar to FIG. 8, that is, 9' centered at 10' is a projection of the section taken through 27 and 11 centered at 12' is a portion of a section adjacent the bit.

I claim:

1. An angle adjustment sub for use in connection with deviated running strings, said sub comprising one section having a box at one end and pin at the other end, a second section having a pin at one end and a box at the other end, the pin of said one section threaded into the box of the section section, means to limit the longitudinal displacement of said threaded pin and box, said means permitting the relative rotation of said sections, and means to lock said sections against relative rotation of one section about the axis of the other section.

2. The sub of claim 1, said means to lock said sections comprising a nut threaded on the pin of one section and adapted to abut the box end of the other section.

3. The sub of claim 1 in which the box of one section is bored by a pair of bores which intersect the interior wall of the box of said one section adjacent the end of said box, a circular groove at the end of the pin of the other section in registry with said bores, studs mounted in said bores and said groove.

4. The sub of claim 3, said means to lock said sections comprising a nut threaded on the pin of one section and adapted to abut the end of the other section.

5. An angle adjustment sub for use in connection with deviated running strings, said sub comprising one section having a box at one end and a pin at the other end, a second section having a pin at one end and a box at the other end, the pin of said one section threaded into the box of the second section means to limit the longitudinal displacement of the threaded pin and box, said means permitting the relative rotation of the pin and box and means to lock said sections against relative rotation of one section about the axis of the other section.

6. The sub of claim 5, said means to lock said sections comprising a nut threaded on the pin of one section and adapted to abut the end of the other section.

7. The sub of claim 5 in which the box of one section is bored by a pair of bores which intersect the interior wall of the box of said one section adjacent the end of said box, a circular groove at the end of the pin of the other section in registry with said bores, studs mounted in said bores and said groove.

8. The sub of claim 7, said means to lock said sections comprising a nut threaded on the pin of one section and adapted to abut the end of the other section.

9. A deviated running string comprising a plurality of vertical angle deviation units, an angle adjusting sub positioned between angle deviation units, said angle adjusting unit including means to angularly adjust the axis of said angle deviation units to coplanar position.

10. The running string of claim 9, said angle adjusting sub comprising one section having a box at one end and a pin at the other end, a second section having a pin at one end and a box at the other end, the pin of said one section threaded into the box of the second section, and means to lock said sections against relative rotation of one section about the axis of the other section.

11. The running string of claim 10, said means to lock said sections comprising a nut threaded on the pin of one section and adapted to abut the box end of the other section.

12. The running string of claim 10 in which the box of one section is bored by a pair of bores which intersect the interior wall of the box of said one section adjacent the end of said box, a circular groove at the end of the pin of the other section in registry with said bores, studs mounted in said bores and said groove.

13. The running string of claim 12, said means to lock said sections comprising a nut threaded on the pin of one section and adapted to abut the end of the other section.

14. The running string of claim 9, said sub comprising one section having a box at one end and a pin at the other end, a second section having a pin at one end and a box at the other end, the pin of said one section threaded into the box of the second section, means to limit the axial displacement of the pin and box, said means allowing relative angular displacement of the pin and box, and means to lock said sections against relative rotation of one section above the axis of the other section.

15. The running string of claim 14, said means to lock said sections comprising a nut threaded on the pin of one section and adapted to abut the end of the other section.

16. The running string of claim 10 in which the box of one section is bored by a pair of bores which intersect the interior wall of the box of said one section adjacent the end of said box, a circular groove at the end of the pin of the other section in registry with said bores, studs mounted in said bores and said groove.

17. The running string of claim 16, said means to lock said sections comprising a nut threaded on the pin of one section and adapted to abut the end of the other section.

18. The running string of claim 8 in which said units include a bent housing connected to a drill bit at one end and a motor at the other end of said housing and another unit is a bent sub.

19. The running string of claim 18, said angle adjusting sub including one section having a box at one end and a pin at the other end, a second section having a pin at one end and a box at the other end, the pin of said one section threaded into the box of the second section, and means to lock said sections against relative rotation of one section about the axis of the other section.

20. The running string of claim 19, said means to lock said sections comprising a nut threaded on the pin of one section and adapted to abut the box end of the other section.

21. The running string of claim 19 in which the box of one section is bored by a pair of bores which intersect the interior wall of the box of said one section adjacent the end of said box, a circular groove at the end of the pin of the other section in registry with said bores, studs mounted in said bores and said groove.

22. The running string of claim 21, said means to lock said sections comprising a nut threaded on the pin of one section and adapted to abut the end of the other section.

* * * * *